United States Patent [19]

Hall

[11] Patent Number: 4,484,315

[45] Date of Patent: Nov. 20, 1984

[54] ULTRASONIC PEST CONTROL DEVICE

[75] Inventor: Lester B. Hall, Kenmore, N.Y.

[73] Assignee: Gary L. Hal, Kenmore, N.Y.

[21] Appl. No.: 422,447

[22] Filed: Sep. 20, 1982

[51] Int. Cl.³ .............................................. H04B 1/02
[52] U.S. Cl. ....................................... 367/139; 43/124
[58] Field of Search ........................... 367/139; 43/124; 340/384 E, 693, 663

[56] References Cited

U.S. PATENT DOCUMENTS

| 4,178,578 | 12/1979 | Hall | 367/139 |
| 4,186,387 | 1/1980 | Moschgat | 340/384 E |
| 4,219,884 | 8/1980 | De Santis | 367/139 |
| 4,257,036 | 3/1981 | Slavin et al. | 340/384 E |

FOREIGN PATENT DOCUMENTS 2054238 8/1980 United Kingdom .

Primary Examiner—Theodore M. Blum
Attorney, Agent, or Firm—Christel, Bean & Linihan

[57] ABSTRACT

A device for generating and radiating ultrasonic sound waves for the control of pests such as rodents, insects and the like comprising a housing having at least two surface portions, an electrically operated sound generator carried by the housing associated with one of the housing surface portions for providing output sound waves directed outwardly from the one surface portion of the housing and in an ultrasonic frequency range normally inaudible to humans and intolerable by pests such as rodents, insects and the like, and a pair of spaced-apart prongs of electrically conducting material extending from the other of the housing surface portions and connected electrically to the sound generator and adapted for insertion manually into the socket of a standard electrical outlet receptacle commonly found in buildings and the like for supplying electricity to the sound generator and simultaneously supporting and holding the device. The prongs are the sole means for supporting and holding the device relative to the outlet. A stabilizing bar extends from the other housing surface portion at a location spaced from the prongs and is adapted to contact the receptacle in a manner spacing the other surface portion a desired distance from the receptacle. The sound generator comprises a plurality of transducers arranged in two groups operating in two frequency ranges in a manner providing a composite output in the form of a random pattern of frequencies and amplitude peaking in the ultrasonic frequency range.

13 Claims, 6 Drawing Figures

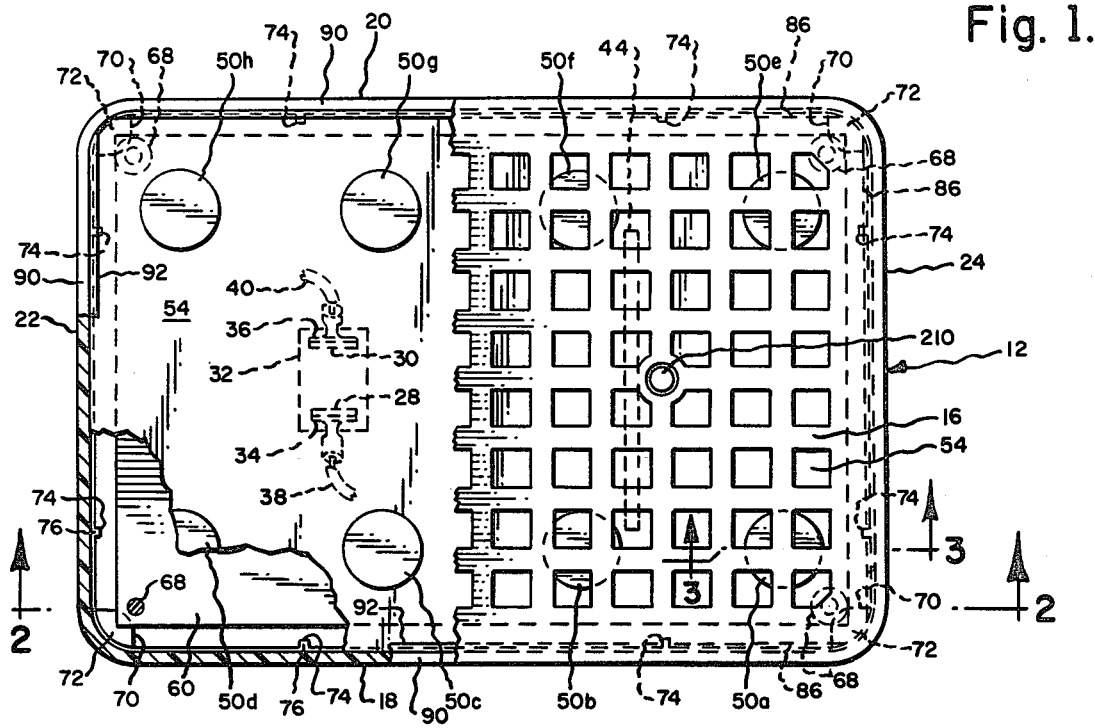
Fig. 1.
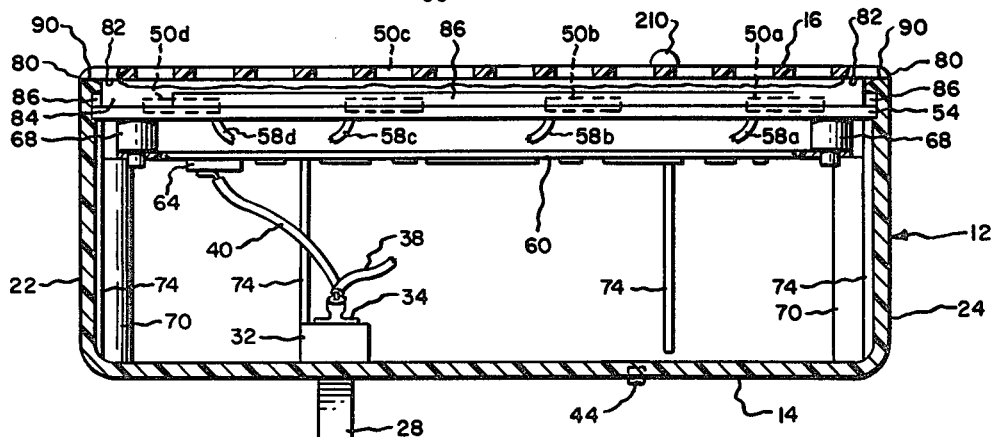
Fig. 2.
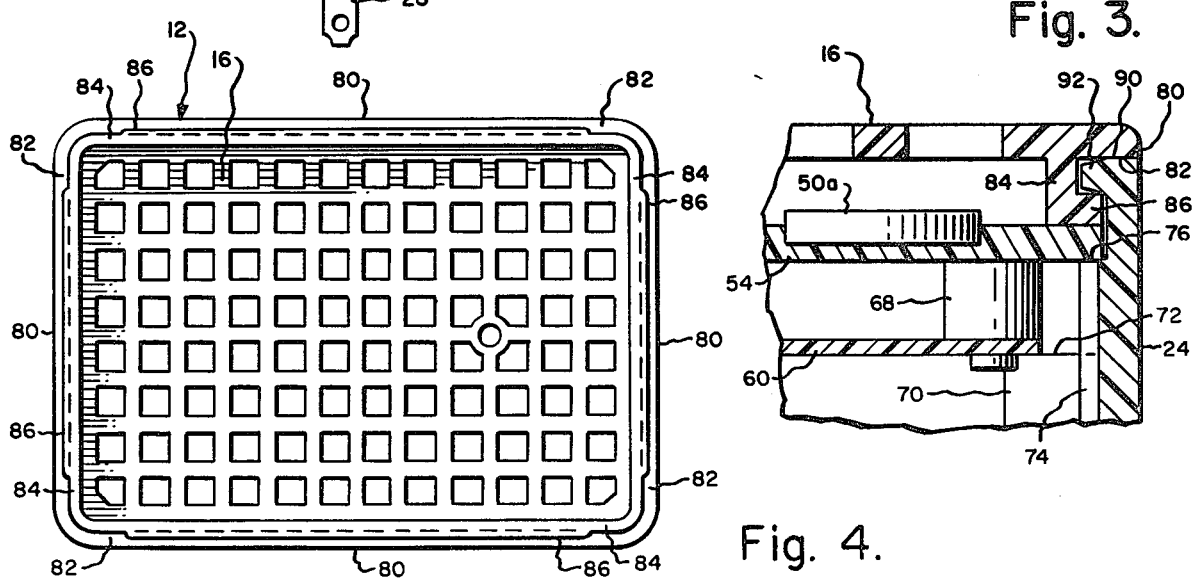
Fig. 3.
Fig. 4.

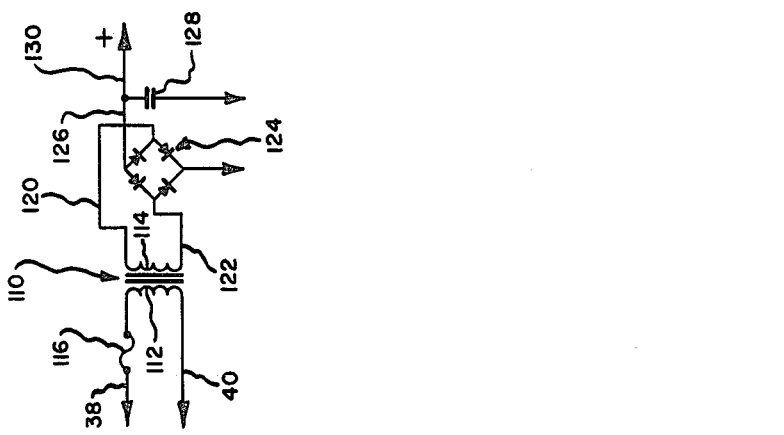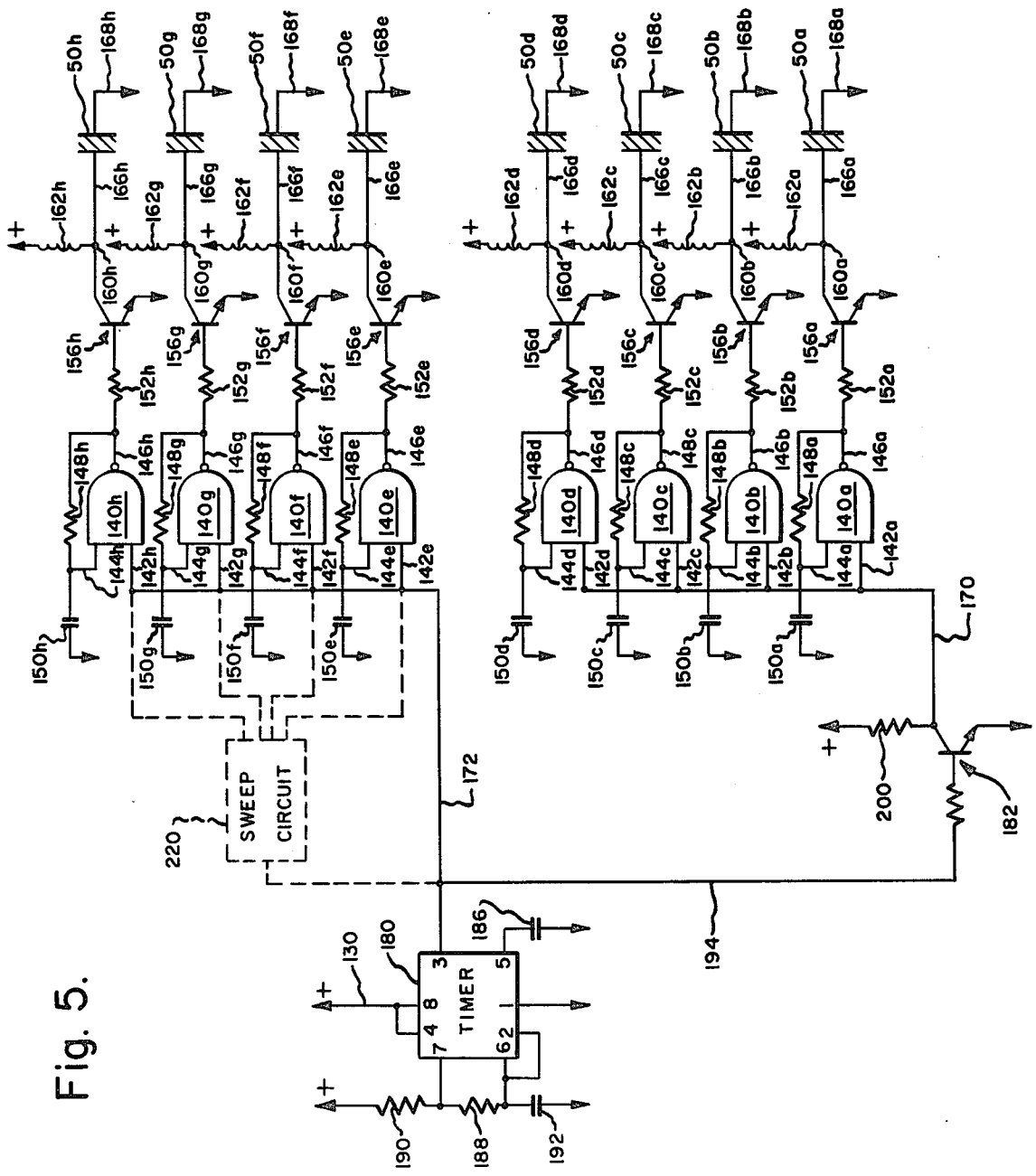

ULTRASONIC PEST CONTROL DEVICE

BACKGROUND OF THE INVENTION

This invention relates to the art of controlling pests such as rodents, insects and the like, and more particularly to a new and improved apparatus for generating and radiating ultrasonic waves for controlling such pests.

It has been discovered that ultrasonic sound waves at a frequency normally inaudible to humans can be effective to repel pests such as rodents, insects and the like. In the design of apparatus for generating and radiating ultrasonic sound waves for controlling such pests, there are a number of important factors to be considered. The sound waves should be emitted in a manner providing maximum stress and irritation to the pests while at the same time being consistent with human safety. The sound waves also should be of a nature to which the pests never can become accustomed or immune. It would be particularly desirable to provide such apparatus which is small in size, light in weight, and which can be plugged in directly to a standard electrical outlet receptacle commonly found in buildings.

SUMMARY OF THE INVENTION

It is, therefore, a principal object of this invention to provide a new and improved ultrasonic pest control device.

It is a more particular object of this invention to provide such a device which is small in size, light in weight, and which can be plugged directly into standard electrical outlet receptacles commonly found in buildings.

It is a further object of this invention to provide such a device which generates ultrasonic waves in a manner providing maximum stress and irritation to the pests while at the same time being safe for use near humans.

It is a more particular object of this invention to provide such a device which generates ultrasonic waves of a nature such that the pests never can become accustomed or immune to such sound waves.

It is a further object of this invention to provide such a device which is relatively simple in construction and economical to manufacture and use.

The present invention provides a device for generating and radiating ultrasonic sound waves for the control of pests such as rodents, insects and the like comprising a housing having at least two surface portions, electrically operated sound generating means carried by the housing associated with one of the housing surface portions for providing output sound waves directed outwardly from the one surface portion of the housing and in an ultrasonic frequency range normally inaudible to humans and intolerable by pests such as rodents, insects and the like, and a pair of spaced-apart prongs of electrically conducting material extending from the other of the housing surface portions and connected electrically to said sound generating means and adapted for insertion manually into the socket of a standard electrical outlet receptacle commonly found in buildings and the like for supplying electricity to the sound generating means and simultaneously supporting and holding the device. The prongs are the sole means for supporting and holding the device relative to the outlet. A stabilizing means extends from the other housing surface portion at a location spaced from the prongs and is adapted to contact the receptacle in a manner spacing the other surface portion a desired distance from the receptacle. The sound generating means comprises transducer means in the form of a plurality of transducers arranged in two groups operating in two frequency ranges in a manner providing a composite output in the form of a random pattern of frequencies and amplitude peaking in the ultrasonic frequency range.

The foregoing and additional advantages and characterizing features will become clearly apparent upon a reading of the ensuing detailed description together with the included drawing wherein:

BRIEF DESCRIPTION OF THE DRAWING FIGURES

FIG. 1 is a front elevational view, with some parts broken away and others in section, of an ultrasonic pest control device according to the present invention;

FIG. 2 is a sectional view taken about on line 2—2 in FIG. 1;

FIG. 3 is a fragmentary sectional view taken about on line 3—3 in FIG. 1;

FIG. 4 is a rear elevational view reduced in size of the grill member in the device of FIG. 1;

FIG. 5 is a schematic circuit diagram of the sound generating means of the device of FIG. 1; and FIG. 6 is a schematic circuit diagram of a power supply for use in the circuit of FIG. 5.

DETAILED DESCRIPTION OF THE ILLUSTRATED EMBODIMENTS

FIGS. 1-4 show an ultrasonic pest control device according to the present invention including a housing generally designated 12 which is somewhat hollow rectangular in overall shape having first and second oppositely directed end surface portions which are spaced apart and disposed in substantially parallel planes. One of the end surface portions is provided by a rear wall 14 which is planar and rectangular in overall shape. The opposite end portion includes a grill member 16 which is in the form of an apertured plate which is rectangular in overall shape. A recess is defined rearwardly of a grill 16 for a purpose which will be described. The wall 14 and grill 16 are joined by a pair of side wall portions 18 and 20 and by a pair of end wall portions 22,24 which meet at substantially right angles and are disposed substantially perpendicular to the end surface portions 14 and 16. Housing 12 is of electrically insulative material of suitable plastic or the like.

The device of the present invention further comprises a pair of spaced-apart prongs 28,30 of electrically conducting material, i.e. metal, extending from housing surface portion 14. Prongs 28,30 extend normal to the plane of surface 14, are mutually parallel, and are in lateral alignment along a line intersecting the prongs and perpendicular to sides 18,20. Prongs 28,30 are spaced apart of such distance and are of a length, width and thickness so as to be manually insertable into a standard socket of an electrical receptacle, commonly found in buildings and the like, and typically of the wall-mounted variety. Prongs 28,30 extend through rear wall 14 and are received in a connector 32 in the form of a solid body fixed to the inner surface of wall 14 by suitable means such as adhesive. Connector 32 includes a pair of terminals 34 and 36 electrically connected in body 32 to prongs 28 and 30, respectively. Terminals 34 and 36 in turn are connected by insulated conductors 38 and 40, respectively, to an electrical circuit of the apparatus in a manner which will be described. The assembly of connector 32 and terminals 28,30 is located substantially equidistant between side walls 18,20. The assembly also is located offset toward end wall 22 along the distance between end walls 22,24.

There is also provided stabilizing means associated with rear wall 14 and extending outwardly therefrom at a location spaced from prongs 28,30 for contacting the electrical outlet receptacle in a manner spacing rear wall 14 a desired distance therefrom. The stabilizing means is in the form of a bar 44 projecting outwardly from rear wall 14, located between walls 18,20 and disposed with the longitudinal axis thereof substantially perpendicular to walls 18,20. Bar 44 can be formed or molded integrally with wall 44 or it can be fixed thereto in a suitable manner. In the device shown, bar 44 is received in a recess formed in the outer surface of wall 14 and secured therein by adhesive. Bar 44 in the device shown terminates at opposite ends a distance from the corresponding walls 18,20. The distance between bar 44 and wall 24 is substantially the same as the distance between prongs 28,30 and wall 22. The distance between bar 44 and prongs 28,30 is such that when prongs 28,30 are inserted in an outlet receptacle, bar 44 will contact a portion of the outer surface of that receptacle. The distance between the outer surface of wall 14 and the outer surface of bar 44 is determined by the amount of spacing between wall 14 and the outlet receptacle for a desired degree of stability. By way of example, in an illustrative device, bar 44 is about 2 inches long, 1/16 inch wide and ⅛ inch thick. Other structures can of course be employed for accomplishing the same function provided by bar 44.

The device of the present invention further comprises sound generating means carried by housing 12 and associated with the other housing surface portion inwardly of grill 16. The sound generating means is positioned so as to direct the output sound waves outwardly away from the associated surface of housing 12. The sound generating means comprises at least one transducer means for providing sound waves when driven by an electrical signal, and the sound waves are in an ultrasonic frequency range normally inaudible to humans and intolerable by pests such as rodents and the like. In the device shown, the transducer means comprises a plurality of transducers, in particular the eight transducers 50a–50h illustrated in FIGS. 1–3. The transducers 50a–50h are generally disc shaped and each is received in a corresponding disc shaped recess in a plate 54 located inwardly of grill 16 disposed substantially parallel thereto and which serves as a supporting means for the transducers 50a–50h. Plate 54 is located a short distance inwardly of grill 16, and transducers 50a–50h are disposed to radiate output ultrasonic waves in a direction extending outwardly from grill 16. The transducers are arranged in two rows spaced inwardly of side walls 18,20 and extending between end walls 22,24. Thus, transducers 50a–50d are in a row extending parallel to housing side wall 18 and the transducers are spaced apart substantially equal distances. Similarly, transducers 50e–50h are in a row extending parallel to housing side wall 20 and the transducers are spaced apart substantially equal distances. In the device shown the transducers in the two rows are in substantial lateral alignment, and the distance between each row of transducers and the corresponding side wall 18 or 20 is smaller than the distance between the two rows of transducers. By way of example, in an illustrative device, each transducer is disc-shaped having a diameter of about ½ inch and a height or thickness of about 1/16 inch.

Each of the transducers 50a–50h is fitted in a corresponding recess in the surface of plate 54 and held therein by suitable means, for example an adhesive such as RTV cement. The recesses can be molded in the plate 54 or countersunk. In the device shown, the circuit for operating transducers 50a–50h is located in housing 12 between plate 54 and housing surface 14 as will be described. As shown in FIG. 2, each transducer can have a two wire conductor, for example the conductors 58a–58d for transducer 50a–50d, respectively, extending from the transducer through an opening provided in plate 54 in the corresponding recess and to the operating circuit in a manner which will be described. One alternative arrangement could include a pair of bladelike contacts corresponding to each transducer, fixed at one end to either plate 54 or to a board within housing 12 on which the circuit components are located, while contacts would engage terminals on the transducers and terminals in the circuit when the housing components are assembled together and thus make electrical connection between the transducers and the circuit.

The circuit for operating transducers 50a–50h is held in housing 12 by a plate element 60 shown in FIG. 2. Preferably plate 60 is connected to plate 54 so as to be supported thereby in spaced relation in a manner which will be described. In the device shown, plate 60 is disposed substantially parallel to plate 54, located between plate 54 and housing surface 14 and positioned near plate 54. Preferably, various components of the circuit are mounted on the surface of plate 60 which faces housing surface 14, and the wiring between components and to the transducer conductors such as conductors 58a–58d shown in FIG. 2 is located on the surface of plate 60 facing plate 54. Connection between conductors 38 and 40 from prongs 28,30 and the circuit is made preferably on the surface of plate 60 facing housing surface 14, and thus conductor 40 is shown in FIG. 2 connected such as by soldering to a circuit component designated 64.

FIG. 3 shows a preferred mechanical arrangement for connecting grill 16, plate 54 and plate 60 to the housing 12, all of which preferably are of plastic material. Plates 54 and 60 are connected together in spaced, parallel relation by spacer-connector elements 68, one at each of the aligned corners thereof. As shown in FIG. 3, one end of spacer 68 is fixed to the surface of plate 54 facing plate 60 by adhesive or other suitable means. Alternatively, the spacers could be formed integrally with plate 54. Each spacer preferably has a cylindrical body which terminates at the opposite end thereof in a smaller diameter shank portion which is fitted into a hole drilled or otherwise found in plate 60. As shown in FIG. 3, the end of the shank projects beyond plate 60. The securement can be merely a friction fit, or augmented by adhesive.

Housing 12 is found to include a supporting column-like formation or post 70 in each corner, each of which terminates in a supporting surface 72 disposed in a plane substantially parallel to surface 14 and located at the level where it is desired that plate 60 be supported. Housing 12 also is formed to include a plurality of supporting ribs 74 extending along the inner surface each of the walls 18,20,22,24 generally prependicular to surface 14 and each terminating in a supporting surface 76 disposed in a plane parallel to surface 14 and located at the level where it is desired to support plate 54 in the housing. Preferably there are two ribs 74 on each wall. Thus, after the transducers 50a–50h are secured to plate 54 the circuit components and wiring are completed on plate 60 and the conductors for the transducers are connected to the circuit components, the plates 54 and 60 are connected together mechanically by the spacer-connectors 68 as previously described and the assembly is moved into housing 12 through the open end opposite surface 14 and positioned in place with plate 60 supported on the post surfaces 72 and plate 54 supported on the rib surfaces 76. As a result, the assembly is firmly supported and held against further inward movement by engagement with the surfaces 72,76. Other supporting arrangements as alternatives to posts 70 and ribs 74 can of course be employed. The assembly also is held in place and against outward movement when grill 16 is assembled in place in the following manner.

As shown in FIG. 3, grill 16 has an outer marginal or peripheral surface 80, and an inner surface portion 82 meets peripheral surface 80 at substantially a right angle. Spaced inwardly of surface 80 is an L-shaped formation which is found integrally with the grill 16. It includes a first leg portion 84 which extends from grill 16 in a distance normal to the plane of the grill, i.e. normal to surface portion 82 and a second leg portion 86 which extends at substantially a right angle to the first leg portion 84 and substantially parallel to the grill surface 82 and outwardly toward the plane of surface 80. The leg portion 86 terminates a short distance inwardly of the plane of surface 80. In the device shown, leg portion 84 is continuous, extending around the entire periphery of grill like a depending rim or skirt formation. Leg portion 86 is in sections, one on each end and side of grill 16 as shown in FIGS. 1 and 4.

Each housing wall terminates in an edge surface 90 which defines the open end of housing 12 opposite surface 14 before grill 16 is assembled in place. Surface 90 meets a ledge formation 92 on each wall which extends inwardly a short distance. Ledge 92 is shaped and sized to fit firmly within the peripheral recess found in grill 16 by the L-shaped formation. In particular, the inward length of ledge 92 between the inner end surface thereof and the inner surface of the associated wall is substantially equal to the length of leg portion 86 measured between the outer end thereof and the outer facing surface of leg portion 84. The width or thickness of ledge 92 measured in a direction perpendicular to surface 90 is substantially equal to the length of leg portion 84 measured between grill surface 82 and the surface of leg portion 86 facing grill surface 82. As a result, when grill 16 is moved into place and the walls flexed outwardly, when they are returned ledge 92 fits firmly in the recess as shown in FIG. 3 to fasten grill 16 to housing 12. Also, the thickness of leg portion 86 is such that the lower surface thereof contacts the upper surface of plate 54 thereby urging plate 54 toward supporting surface 72. As a result, when grill 16 is snap-fit into housing 12 it also serves to hold the assembly of plates 54,60 firmly in place. If desired, adhesive can be employed to fix grill 16 into place.

FIG. 5 is a schematic circuit diagram of the sound generating means of the device of FIGS. 1–4, and FIG. 6 shows a power supply circuit for use with the circuit of FIG. 5. Turning first to the power supply shown in FIG. 6, it is connected to a standard 120 or 240 volt a.c. line through the prongs 28,30 shown in FIGS. 1 and 2 when the device is inserted in an electrical outlet receptacle as previously described. The power supply includes a transformer 110 having primary and secondary windings 112 and 114, respectively. One terminal of primary winding 112 is connected through a fuse 116 to conductor 38 shown in FIG. 2, and the other terminal of winding 112 is connected to conductor 40. The secondary winding 114 is connected by lines 120,122 to a full wave diode bridge rectifier 124, the output of which is connected by line 126 to one terminal of a capacitor 128, the other terminal of which is connected to the circuit ground or reference. Also, the other output point of the diode network forming bridge rectifier 124 is connected to the circuit ground or reference as shown in FIG. 6. The power supply provides a positive direct voltage on output line 130 which is connected to various points in the circuit of FIG. 5 as will be explained. By way of example, in an illustrative circuit transformer 110 is for use with a.c. line voltage at 120 volts and 60 cycles and capacitor 128, which serves as a filter capacitor, has a magnitude of 1000 microfarads. The voltage on line 130 is 50 volts.

Turning now to the sound generating means as shown in FIG. 5, in accordance with the present invention the sound generating means comprises transducer means in the form of a plurality of transducers arranged in two groups operating in two frequency ranges in a manner providing a composite output in the form of a random pattern of frequencies and amplitude peaking in the ultrasonic frequency range. FIG. 5 illustrates the transducers arranged in two groups, and for example one group could be the transducers 50a–50d included in the one row shown in FIG. 1, and the other group could include the transducers 50e–50h included in the second row as shown in FIG. 1. Other physical arrangements can of course be employed. The two groups of transducers functionally are operated in two frequency ranges, one frequency range being relatively higher than the other and, accordingly, the other frequency range being relatively lower than the other. In the illustrative device shown, the lower frequency range is from about 20 kilohertz to about 35 kilohertz. This frequency range has been found to be particularly effective in repelling rodents and the like. The higher frequency range in the device shown can be in a range above 50 kilohertz, and this frequency range has been found effective in repelling insects and cockroaches.

The two groups of transducers are operated to provide a composite output in the form of a random pattern of frequencies and amplitude peaking in the ultrasonic frequency range. In particular, each of the transducers 50a–50d operating in the relatively lower frequency range is driven at a frequency different from the natural frequency of oscillation of the particular transducer. Each of the transducers 50e–50h operating in the higher frequency range is driven at the natural frequency of oscillation of the particular transducer. There is provided switching means for causing only one group of the transducers to operate at a particular time, i.e. first the one group of transducers is switched on and then it is switched off and then the other group switched on and this sequence is repeated for the duration of the operation of the sound generating means.

There is a driver means for each transducer and the driver means, in turn, comprises oscillator means drivingly coupled to the transducer. Referring first to transducer 50a, there is provided oscillator means in the form of a NAND gate 140a connected as a gated oscillator. In particular, gate 140a has a pair of input terminals 142a,144a and an output terminal 146a. There is a tuning network operatively associated with the NAND gate 140a and it comprises a resistor 148a connected between the output terminal 146a and input terminal 144a and a capacitor 150a connected from the junction of terminal 144a and resistor 148a to the circuit ground or reference. Thus, NAND gate 140a and the tuning network function as a gated oscillator. The output of the gated oscillator is connected through a resistor 152a to the base terminal of a driver transistor 156a. Transistor 156a is of the NPN type, and the emitter terminal of transistor 156a is connected to the circuit ground or reference. The collector terminal 160a of transistor 156 is connected to one terminal of a coil 162a serving as a driver choke, the other terminal of which is connected to line 130 from the power supply. The collector terminal 160a, being the output terminal of the driver transistor, is connected by a line 166a to one terminal of transducer 50a, and the other terminal of the transducer is connected by a line 168a to the circuit ground or reference. The lines 166a,168a comprise the two wire conductor 58a shown in FIG. 2.

As shown in FIG. 5, each of the other three transducers 50b,50c and 50d of the group has a corresponding driver means in the form of a NAND gate and associated tuning network functioning as a gated oscillator which is coupled through a resistor to a driver transistor which, in turn, is connected to a driver choke coil and the corresponding transducer. For convenience in illustration, the driver means components for the other transducer 50b,50c and 50d are identified by the same reference numbers as the driver means components for transducer 50a but with the corresponding letters b,c or d. The input terminals 142a,142b,142c and 142d of the NAND gates 140a, 140b,140c and 140d, respectively, are connected together and to a line 170 leading to the switching means in a manner which will be described.

Turning now to the other group of transducers, for transducer 50e there is provided oscillator means in the form of NAND gate 140e connected as a gated oscillator. In particular, gate 140e has a pair of input terminals 142e,144e and an output terminal 146e. There is a tuning network operatively associated with NAND gate 140e comprising a resistor 148e connected between the output terminal 146e and input terminal 144e and a capacitor 150e connected from the junction of terminal 144e and resistor 148e to the circuit ground or reference. Thus, NAND gate 140e and the tuning network function as a gated oscillator. The output of the gated oscillator is connected through a resistor 152e to the base terminal of a driver transistor 156e. Transistor 156e is of the NPN type, and the emitter terminal of transistor 156e is connected to the circuit ground or reference. The collector terminal 160e of transistor 156 is connected to one terminal of a coil 162e serving as a driver choke, the other terminal of which is connected to line 130 from the power supply. The collector terminal 160e, being the output terminal of the driver transistor, is connected by a line 166e to one terminal of transducer 50e, and the other terminal of the transducer is connected by a line 168e to the circuit ground or reference.

As shown in FIG. 5, each of the other three transducers 50f, 50g and 50h of the group has a corresponding driver means in the form of a NAND gate and associated tuning network functioning as a gated oscillator which is coupled through a resistor to a driver transistor which, in turn, is connected to a driver choke coil and the corresponding transducer. As with the first group, the driver means components for the other transducers 50f, 50g and 50h are identified by the same reference numerals but with the corresponding letters f, g or h. The input terminals 142e, 142f, 142g and 142h of the NAND gates 140e, 140f, 140g and 140h, respectively, are connected together and to a line 172 to the switching means in a manner which will be described. The sound generating means of FIG. 5 further comprises switching means operatively connected to the transducer means for causing only one group of the transducers to operate at a particular time. In particular, first one of the groups of transducers is switched on, then switched off and the other group switched on. When the other group is switched off then the one group is switched on and so on for as long as the sound generating means is in operation. The switching means includes an integrated circuit timer 180 and a transistor switch 182. In particular, timer 180 in the present illustration is a commercially available Signetics NE555 timer, and the various terminal pin numbers of that particular timer are indicated in FIG. 5. Terminal number 1 is connected to the circuit electrical ground or reference, and terminals 4 and 8 are connected to line 130 which provides the positive direct supply voltage. Terminal is connected through a capacitor 186 to the circuit ground or reference. Terminals 2 and 6 are connected together, and a resistor 188 is connected between terminals 6 and 7. One terminal of resistor 188 is connected through another resistor 190 to line 130 providing the positive direct supply voltage. The other terminal of resistor 188 is connected through a capacitor 192 to the circuit ground or reference. Terminal 3 is the timer output and it is connected to line 172 and through a line 194 and resistor 196 to the base terminal of transistor switch 182. The emitter of transistor 182 is connected to the circuit ground or reference, and the collector terminal is connected to line 170 and through a resistor 200 to line 130 providing the positive direct supply voltage.

The apparatus of the present invention operates in the following manner. One or more units of apparatus is installed in a room or area from which it is desired to repel and eliminate pests such as rodents. Advantageously, each unit is installed simply by grasping it by hand and inserting prongs 28,30 into a standard receptacle commonly found on walls and ceilings. Housing 12 is of electrically insulating material for purposes of safety. When the prongs or blades 28,30 are tight in the outlet, an electric circuit is made from the supply line through prongs 28,30 and conductor 38,40 to the power supply shown in FIG. 6. Advantageously, the mechanical engagement between prongs 28,30 and the socket serves to hold or support the entire unit mechanically, thereby avoiding the need to provide separate supporting arrangements. Bar 44 serves to stabilize the unit mechanically when inserted in the outlet and to control the physical spacing between the surface of the device housing and the outlet receptacle. An indicator lamp 210 mounted in grill 16 can be energized from the power supply to indicate that the device is operating. Each unit is installed in a manner so as to be disposed to direct the output ultrasonic sound waves generally in the region of the ground or floor where the rodents and similar pests normally travel. Thus the units typically would be plugged into sockets located on ceilings or on walls at a relatively low height near the floor. While an important advantage of the apparatus is the capability of installation in existing outlet receptacles in a building, additional receptacles can of course be wired in the building or area at locations specially selected for the apparatus. The apparatus is relatively small in size and light in weight and convenient to install in a variety of locations. The pest control apparatus finds wide use in residential buildings and the like.

As shown in FIG. 5, each transducer 50a–50h is connected to the positive direct supply voltage on line 130 when the corresponding driver transistor 156a–156h is turned off. The corresponding oscillators including NAND gates 140a–140h apply to the transistors square wave signals to turn the transistors off and on at substantially the oscillator frequency signal. The corresponding inductors 162a–162h shift the phase of the square wave signals applied to the transducers. As a result, the transducers 50a–50h are driven or oscillated by these signals. In accordance with the present invention, transistors 50a–50d in the first group are driven by signals having a frequency different from the natural frequency of the corresponding transducer, and transistors 50e–50h are driven by signals having a frequency substantially equal to the natural frequency of the corresponding transducer. In particular, the magnitudes for resistors 148a–148d and capacitors 150a–d which comprise the tuning networks for NAND gates 140a–140d are selected to apply square wave signals to transducers 50a–50d, respectively, having a frequency about 1 to 3 percent greater than the natural oscillation frequency. The transducers of this group are driven at frequencies above the natural frequencies to avoid producing output waves at a frequency less than about 20 kilohertz which is about the threshold frequency below which the effect on pests such as rodents may begin to be less effective. The resulting frequencies will never be below the transducer resonant or natural frequency which serves as a lower limit or stabilizer. The magnitudes for resistors 148e–148h and capacitors 150e–150h which comprise the tuning networks for NAND gates 140e–140h are selected to apply square wave signals to transducers 50e–50h, respectively having a frequency substantially equal to the natural oscillation frequency.

In the device shown, the combination of timer 180 and transistor switch 182 switches the transducer groups 50a–50d and 50e–50h on and off alternately and at a predetermined rate. Timer 180 provides a square wave output at terminal 3 which is applied by line 172 to the NAND gates 140e–140h for driving transducers 50d–50h, and in the arrangement shown the NAND gate oscillators 140e–140h provide output signals during the relatively high or positive portion of the square wave signal on line 172. At the same time, the positive or high signal level on line 172 causes transistor 182 to conduct placing line 170 relatively low with the result that NAND gates 140a–140d do not produce output signals and the group of transducers 50a–50d is not driven on this cycle of the signal on line 172. By proceeding through a similar analysis, it is seen that during the relatively low or negative portion of the square wave signal on line 172, NAND gates 140e–140h are not on and transducers 50e–50h are not driven and NAND gates 140a–140d are on and transducers 50a–50d are driven. Thus transistor 182 and the associated circuit function as an inverter. The foregoing operation repeats at the rate or frequency of the square wave output on terminal 3 of timer 180, and by way of illustration this frequency can be about 0.25 hertz. According to an illustrative mode of the present invention, each of the two groups of transducers is on about one-half the time.

As a result of the foregoing, the pest control apparatus provides a composite output in the form of a random pattern of harmonics in the ultrasonic frequency range which is normally inaudible to humans and intolerable by pests such as rodents and the like. In particular, the provisions of a group of transducers which a significant portion of the time will be providing output sound waves of slightly different frequencies will give rise to variation in amplitude known as beats. Each transducer, being driven at a frequency slightly greater than its natural frequency of oscillation will behave in a manner seeking or hunting for its natural frequency. This gives rise to a peaking effect as the transducer nears its natural or resonant frequency, and the foregoing is similar to the wowing phenomenon in broadcast communications where unstable frequencies give rise to variations in sound. Another illustration of the foregoing phenomenon is a mis-tuned radio receiver which is seeking or hunting the resonant frequency at which it normally would be tuned, the receiver cycling back and forth about the resonant frequency and exhibiting a momentary sharp increase or peaking of amplitude each time the natural frequency is reached momentarily. As each transducer hunts or seeks its natural or resonant frequency, but never stabilizing there, harmonics of the instantaneous transducer frequency also are produced. The random nature of the output pattern provided by the foregoing is furthered by the operation of timer 180 and switch 182 which turns the oscillators on and off at a predetermined rate. In addition, the provision of a plurality of transducers provides a relatively more potent noise level or amplitude as compared to a single transducer device.

By way of example, in illustrative apparatus, transducers 50a–50d can have natural oscillation frequencies of 20, 25, 30 and 35 kilohertz, respectively, and trandducers 50e–50h can have natural oscillation frequencies of 50, 60, 70 and 80 kilohertz, respectively. Transducers 50a–50h can be of the piezoelectric type commercially available from Linden Laboratories of State College, Pa. under Model No. M-207 for transducers 50a–50d and Model No. H-230 for transducers 50e–50h. Other types can of course be employed. Inductors 160a–160h each has a magnitude of 10 microhenries, each of the resistors 152a has a magnitude of 1 kilohm, and each of the capacitors 150a–150h has a magnitude of 0.01 microfarad. Resistors 148a–148h have magnitudes of 22, 27, 33, 47, 4.7, 6.8, 8.2 and 10 kilohms, respectively. Resistors 196 add 200 in the circuit of transistor 182 have magnitudes of 10 kilohms and 1 kilohm, respectively. For the components with timer 180, capacitors 186 and 192 have magnitudes of 0.01 and 10 microfarads, respectively, and resistors 188 and 190 have magnitudes of 220 and 100 kilohms, respectively.

Various alternatives can be employed in the circuit of FIG. 5. For example, it may be desired to sweep or sequence through the operation of the group of transducers 50e–50h. For this purpose, input terminals 142e–142h of NAND gates 140e–140h are not connected directly to output terminal 3 of timer 180 but instead are connected to a sweeping circuit 220 shown in broken lines in FIG. 5, which in turn, is connected through line 172 to output terminal 3 of timer 180. Circuit 220 functions as a sequencer which in response to either the high or low signal level on line 172 sequentially applies signals to input terminals 142e–142h of NAND gates 140e–140h. As a result transducers 50e–50h are driven in a sequential or sweeping fashion, one after the other during each half cycle of the signal on line 172. Alternatively, circuit 220 can have means enabling it to provide the sequential output signals during both cycles of the signal on line 172 with the result that the foregoing sweeping or sequential operation of transducers 50e–50h is repeated continuously, i.e. with no gaps corresponding to a half cycle of the signal on line 172. As a further alternative, without the sweeping circuit 220, it may be desired to operate either or both of the groups of transducers continuously, and this can be accomplished by adding appropriate logic circuits associated with either or both of line 172 and transistor 182. As a result, transducers 50a–50d could be driven continuously while transducers 50e–50h are switched on and off by timer 180, transducers 50a–50d could be switched on and off by timer 180 and transistor 182 while transducer 50e–50h are driven continuousl or all transducers 50a–50h could be driven continuously. In this connection, a further illustrative mode would include operating transducers 50a–50d on 60 percent of the time and off 40 percent of the time while transducers 50e–50h are operated all of the time and sweeping through the various frequencies as previously described.

The ultrasonic sound waves produced by the apparatus of the present invention are normally inaudible to humans and intolerable by pests such as rodents insects and the like. The ultrasonic sounds are greatly disturbing and irritating to the pests, repelling them from the vicinity of the apparatus thereby keeping them away from food, upsetting their mating habits and having a generally deleterious effect on their nervous systems. The apparatus of the present invention, having two groups of transducers and characterized by the random output sound pattern, peaking, noise level increase and other attributes described hereinabove produces the foregoing effects on pests very effectively. In addition, the random nature of the output ultrasonic waves produced by the apparatus of the present invention precludes the pests from ever becoming accustomed to or developing tolerance for the ultrasonic output. The one group of transducers is operated in a frequency range effective against rodents such as rats, squirrels and mice, and the other group of transducers is operated in a frequency range effective against cockroaches and other insects. The apparatus is relatively small in size, light in weight and readily and easily installed in existing electrical receptacles of the type commonly found in conventional buildings.

It is therefore apparent that the present invention accomplishes its intended objects. While embodiments of the present invention have been described in detail, this is for the purpose of illustration, not limitation.

I claim:

1. Apparatus for generating and radiating ultrasonic sound waves for the control of pests comprising:
   (a) a housing having at least one end;
   (b) a plurality of transducers carried by said housing adjacent said one end and arranged in first and second groups for providing sound waves when driven by corresponding electrical signals, said sound waves being at frequencies normally inaudible to humans and intolerable by pests such as rodents and insects, each of said transducers having a natural frequency of oscillation, said transducers of said first group operating in a frequency range from about 20 kilohertz to about 35 kilohertz and said transducers of said second group operating in a frequency range above about 50 kilohertz;
   (c) first driver means operatively connected to said transducers of said first group for applying electrical signals to said transducers to provide said sound waves, said first driver means applying to each of said transducers of said first group an electrical signal having a frequency different from the natural frequency of said transducer to provide a composite output in the form of a random pattern of frequencies and amplitude peaking in the ultrasonic frequency range;
   (d) second driver means operatively connected to said transducers of said second group for applying electrical signals to said transducers to provide said sound waves, said second driver means applying to each of said transducers of said second group an electrical signal the same as the natural frequency of said transducer;
   (e) switching means operatively connected to said first and second driver means for causing said first and second groups of transducers to operate one at a time; and
   (f) means carried by said housing for supplying electrical current to said first and second driver means.

2. Apparatus according to claim 1, further including sweep circuit means operatively associated with said second driver means for causing sequential operation of said transducers in said second group.

3. Apparatus according to claim 1 wherein each of said driver means comprises a gated oscillator for each transducer and means for coupling the output of said oscillator to said transducer.

4. Apparatus according to claim 3, wherein said coupling means ccmprises a driver transistor, the base terminal of which is coupled to said oscillator output and the collector-emitter circuit of which is connected through a driver coil to a source of driving voltage and to said transducer.

5. Apparatus according to claim 1 wherein each of said driver means comprises a NAND gate for each transducer and connected as a gated oscillator, and a driver transistor for each transducer having the base terminal thereof coupled to the output of said NAND gate and the collector-emitter circuit thereof connected through a driver coil to a source of driving voltage and to said transducer.

6. Apparatus according to claim 5, wherein said switching means comprises timer means for providing an alternating output signal, means for applying said alternating signal to the inputs of said NAND gates of one of said groups of said transducers, and inverter means operatively connected to said timer means for applying the inverse of said alternating signal to the inputs of said NAND gates of the other of said groups of transducers.

7. Apparatus according to claim 5 further including sweep circuit means operatively connected between said switching means and said NAND gates of said second group of transducers for causing sequential operation of said transducers in said second group.

8. An ultrasonic pest control device adapted for connection to an electrical outlet of the type including a receptacle having a socket including a pair of openings to receive prongs of a plug type electrical connector, said device comprising:
   (a) a housing having a first surface portion and another surface portion adapted to face a region containing pests when connected in the socket;
   (b) sound generating means carried by said housing and associated with said other surface portion, said sound generating means including transducer means for providing sound waves when driven by an electrical signal, said sound waves being in a frequency range normally inaudible to humans and intolerable by pests such as rodents and insects;

(c) said sound generating means being positioned to direct said output sound waves outwardly away from said other surface portion of said housing;

(d) a pair of spaced-apart prongs of electrically conducting material extending from said first surface of said housing, said prongs being of a size, spacing and disposition so as to permit insertion into a socket of an electrical outlet receptacle;

(e) means for connecting said prongs electrically to said sound generating means; and (f) stabilizing means carried by and extending outwardly from said first surface of said housing spaced from said prongs and located for contacting a surface of the electrical outlet receptacle in a manner spacing said housing surface a desired distance from the receptacle so as to stabilize said housing;

(g) whereby when said prongs are inserted in the electrical outlet electric current is supplied to said sound generating means and said housing is supported mechanically by the receptacle.

9. Apparatus according to claim 8, wherein said stabilizing means comprises a solid member extending from said first surface in a direction generally normal to the plane of said first surface.

10. Apparatus according to claim 9, wherein said member comprises a bar having a longitudinal axis disposed generally parallel to a line intersecting said prongs.

11. Apparatus according to claim 8, wherein said housing is of electrically insulative material.

12. Apparatus according to claim 8, wherein said other surface portion is generally planar and wherein said transducer means comprises a plurality of transducer elements arranged physically in two groups on said other surface portion.

13. Apparatus according to claim 8, wherein said housing is generally rectangular in shape and said first surface portion and said other surface portion face in opposite directions.

* * * * *